United States Patent
Kim et al.

(10) Patent No.: US 7,200,789 B2
(45) Date of Patent: Apr. 3, 2007

(54) REVERSE TRANSMISSION APPARATUS AND METHOD IN A MOBILE COMMUNICATION SYSTEM SUPPORTING HARQ

(75) Inventors: Youn-Sun Kim, Songnam-shi (KR); Hwan-Joon Kwon, Hwasong-shi (KR); Dong-Hee Kim, Seoul (KR)

(73) Assignee: Samsung Electronics Co., Ltd. (KR)

(\*) Notice: Subject to any disclaimer, the term of this patent is extended or adjusted under 35 U.S.C. 154(b) by 532 days.

(21) Appl. No.: 10/724,909

(22) Filed: Dec. 1, 2003

(65) Prior Publication Data

US 2004/0137930 A1 Jul. 15, 2004

(30) Foreign Application Priority Data

Nov. 29, 2002 (KR) ............... 10-2002-0075545
Dec. 3, 2002 (KR) ............... 10-2002-0076279

(51) Int. Cl.
*H04L 1/18* (2006.01)
*G08C 25/02* (2006.01)

(52) U.S. Cl. ............... 714/748
(58) Field of Classification Search ............... 714/748
See application file for complete search history.

(56) References Cited

U.S. PATENT DOCUMENTS 6,996,763 B2* 2/2006 Sarkar et al. ............... 714/749

* cited by examiner

*Primary Examiner*—Shelly Chase
(74) *Attorney, Agent, or Firm*—The Farrell Law Firm

(57) ABSTRACT

A mobile station apparatus and method for retransmitting data in a reverse direction upon receiving a retransmission request for the data transmitted in the reverse direction from a bases station after transmitting the data in the reverse direction in a mobile communication system supporting hybrid automatic retransmission request (HARQ). The apparatus comprises a radio frequency (RF) receiver for receiving a retransmission control signal for the reverse data over a forward link; and a controller for determining whether to retransmit the reverse data using the retransmission control signal received from the RF receiver, and controlling transmission of retransmission data using a traffic-to-pilot power ratio (TPR) included in the retransmission control signal.

42 Claims, 11 Drawing Sheets

REVERSE TRANSMISSION APPARATUS AND METHOD IN A MOBILE COMMUNICATION SYSTEM SUPPORTING HARQ

PRIORITY

This application claims priority under 35 U.S.C. § 119 to an application entitled "Reverse Transmission Apparatus and Method in a Mobile Communication System Supporting HARQ" filed in the Korean Intellectual Property Office on Nov. 29, 2002 and assigned Serial No. 2002-75545, and an application entitled "Reverse Transmission Apparatus and Method in a Mobile Communication System Supporting HARQ" filed in the Korean Intellectual Property Office on Dec. 3, 2002 and assigned Serial No. 2002-76279, the contents of both of which are incorporated herein by reference.

BACKGROUND OF THE INVENTION

1. Field of the Invention

The present invention relates generally to an apparatus and method for transmitting data in a mobile communication system supporting hybrid automatic retransmission request (HARQ), and in particular, to an apparatus and method for transmitting reverse data in the mobile communication system supporting HARQ.

2. Description of the Related Art

In general, mobile communication systems can be classified into a system supporting only a voice service and a system supporting only a data service. A typical example of such systems includes a code division multiple access (CDMA) mobile communication system. Of the current CDMA systems, an IS-95 system corresponds to the system supporting only a voice service. However, as communication technology has developed and user demand have increased, a mobile communication system has develop into an advanced system supporting a data service. For example, a CDMA2000 system is a typical mobile communication system that has been proposed to support both a voice service and a high-speed data service.

In a mobile communication system, data transmission/reception is generally performed in a radio link, and as a result, data may suffer a loss during its transmission. In a non-real-time service, if such a data loss occurs, the defective data must be retransmitted. That is, in a voice service, which is a typical real-time service, even though a data loss occurs, it is not necessary to retransmit the defective data. However, in a packet data service, which is a non-real-time service, if a data loss occurs, the defective data must be retransmitted to deliver a correct message. Therefore, a communication system capable of data transmission performs data retransmission with one of several automatic retransmission request (ARQ) schemes. The most common ARQ is hybrid automatic retransmission request (HARQ).

Moreover, in a mobile communication system, data transmission can be generally divided into transmission from a base station to a mobile station and transmission from a mobile station to a base station. Commonly, the transmission from a base station to a mobile station is called "forward transmission," while the transmission from a mobile station to a base station is called "reverse transmission."

In reverse data transmission, the CDMA2000 mobile communication system obtains reception performance on a specific level by performing power control on a traffic channel. If a reception error occurs during data transmission over the traffic channel, the defective data is retransmitted using a method of retransmitting a radio link protocol (RLP). Such a RLP retransmission scheme is disadvantageous in that a time required from when a reception error occurred to when the defective data is retransmitted is very long, because a receiver cannot process received packet data in a physical layer, and can process the received packet data in a radio link layer higher than the physical layer, or a layer higher than the radio link layer. In addition, in the RLP retransmission scheme, received defective data cannot be reused.

HARQ can resolve the disadvantages of the RLP retransmission scheme. HARQ retransmits a received defective packet in a physical layer. Therefore, HARQ can resolve the long error processing time problem occurring in the RLP retransmission scheme. In addition, because retransmission is performed in the physical layer, the received defective packet data can be reused.

FIG. 1 is a diagram illustrating a structure of reverse channels in a CDMA2000 mobile communication system. As illustrated in FIG. 1, reverse channels for the CDMA2000 system include a reverse pilot channel 101 for transmitting a reverse pilot signal, a fundamental channel (FCH) 103, and a supplemental channel (SCH) 105. The pilot signal transmitted over the reverse pilot channel 101 is a signal that is always transmitted in a reverse direction when a mobile station transmits traffic. A base station controls a reception power level of the pilot signal so that it approaches a target value set by the base station. Traffic data transmitted over the fundamental channel 103 is always set when the supplemental channel 105 is set up, and delivers signaling information to perform reverse outer loop power control. A data rate of the fundamental channel 103 is variable, and each data rate has its own unique traffic-to-pilot power ratio (TPR). For example, as to the TPR, in Radio Configuration 3 of the CDMA2000 system, data rates of 9.6 kbps, 4.8 kbps, 2.7 kbps, and 1.5 kbps are available, and traffic is transmitted at traffic power of 3.75 dB, −0.25 dB, −2.75 dB, and −5.875 dB over pilot power at the data rates.

A TPR value that is changed according to a data rate of the fundamental channel 103 can be replaced with a different value by a factor such as existence/non-existence of the supplemental channel 105 and a data rate of the supplemental channel 105. In addition, because such a TPR value is transmitted using a signaling method, a long time is required in transmitting the TPR value. That is, because variations in a data rate and reception performance are updated by 20 ms, a long time is required in a signaling procedure for changing a TPR value.

The supplemental channel 105 is formed only when there is a service to be transmitted over a supplemental channel. In addition, like the fundamental channel 103, the supplemental channel 105 has a different TPR value at each data rate. First, in a service period of a supplemental channel, the fundamental channel 103 always transmits data, whereas the supplemental channel 105 intermittently transmits data only when data transmission is necessary. Second, the fundamental channel 103 is different from the supplemental channel 105 in data rate. Third, during outer loop power control, the supplemental channel 105 is not considered and only the fundamental channel 103 is considered.

When the fundamental channel 103 and the supplemental channel 105 are provided as stated above, the supplemental channel 105 transmits traffic information, which is user data, while the fundamental channel 103 transmits control information. The control information transmitted over the fundamental channel 103 becomes information for controlling information on traffic transmitted over the supplemental channel 105 and transmission/reception parameters.

FIG. 2 is a signal flow diagram during reverse data transmission in a CDMA2000 mobile communication system supporting HARQ. In addition, FIG. 2 illustrates a signaling flow during initial transmission and retransmission of data over the reverse supplemental channel 105 when the reverse pilot channel 101 and the reverse fundamental channel 103 are set up.

When there is data to be transmitted in a reverse direction, a mobile station (MS) initially transmits the data over a supplemental channel according to a present TPR value in step 201. Then a base station (BS) receives the initially transmitted data, and determines in step 202 whether an error has occurred in the initially transmitted data. If an error has occurred in the initially transmitted data, the base station transmits to the mobile station a NACK signal indicating occurrence of an error in step 203. The mobile station then receives the NACK signal transmitted by the base station in step 204. Upon receiving the NACK signal, the mobile station retransmits the initially-transmitted data at a TPR value negotiated with the base station in step 205. Here, that a TPR value of the supplemental channel 105 is constant means that a ratio of a power level of a reverse pilot signal to a power level of a supplemental channel, both channels being power-controlled, is constant.

If the initially-transmitted data is retransmitted in this way, the base station receives the retransmitted data in step 206. Further, the base station combines the received retransmitted data with the initially-transmitted data and determines whether an error has occurred in the combined data, in step 206.

As described above, if an error has occurred, the base station transmits a NACK signal as it requested retransmission in step 203. However, if it is determined that there is no error in the combined signal, the base station transmits an ACK signal in step 207. Then, in step 208, the mobile station receives the ACK signal and immediately stops retransmission of the packet for which the ACK signal was received. Unlike this, if the number of retransmissions is limited to a predetermined number, the mobile station ends retransmission after performing the retransmission as many times as the predetermined number.

In HARQ described in conjunction with FIG. 2, the same code symbols as those transmitted at initial transmission are transmitted at the same TPR value as that used at the initial transmission. For example, if power of a supplemental channel transmitted at initial transmission is 10 times higher than signal power of a pilot channel, then during retransmission, the same code symbols as code symbols transmitted at initial transmission are transmitted at power 10 times higher than signal power of a pilot channel as done at initial transmission.

Maintaining the TPR value used at the initial transmission even during retransmission is equivalent to not considering a ratio Eb/Nt of energy to interference per bit of the supplemental channel 105 received at initial transmission. Therefore, retransmission power becomes higher or lower than required power. If the retransmission power is higher than the required power, the retransmission power functions as interference to other users, deteriorating a channel environment. In contrast, if the retransmission power is lower than required power, HARQ performance is deteriorated undesirably. In addition, even when a code rate of initial transmission is high, the same code symbols as those transmitted at initial transmission are transmitted during retransmission, so performance improvement through incremental redundancy (IR) becomes impossible.

Herein, "performance improvement by IR" refers to performance improvement achieved by differentiating code symbols transmitted at initial transmission from code symbols transmitted at retransmission when a code rate of initial transmission is high, thereby decreasing the entire code rate during retransmission. That is, "performance improvement by IR" refers to performance improvement by energy gain, and to performance improvement by a variation in the entire code rate, the sum of a code rate of initial transmission and a code rate of retransmission. That is, when the same data as that transmitted at initial transmission is transmitted at the same TPR as used at the initial transmission, during retransmission, performance improvement through IR becomes impossible undesirably. In addition, because the same TPR value is used, power control according to a required TPR value is not achieved during retransmission.

In addition to the method of maintaining a constant TPR even retransmission, there is a possible HARQ method of setting a TPR value during retransmission to a predetermined value. For example, if TPR at initial transmission is 10, TPR at retransmission is automatically set to 5.

Maintaining the same TPR value at both initial transmission and retransmission or using a predetermined TPR value is equivalent to not considering Eb/Nt of a supplemental channel 105 received at initial transmission. As a result, retransmission power becomes higher or lower than required, deteriorating HARQ performance.

SUMMARY OF THE INVENTION

It is, therefore, an object of the present invention to provide a transmission/reception apparatus and method for reducing unnecessary interference to other users during reverse data retransmission in a mobile communication system supporting HARQ.

It is another object of the present invention to provide a transmission/reception apparatus and method for preventing deterioration of HARQ performance during reverse data retransmission in a mobile communication system supporting HARQ.

It is further another object of the present invention to provide a transmission/reception apparatus and method for improving HARQ performance during reverse data retransmission in a mobile communication system supporting HARQ.

To achieve the above and other objects, there is provided a mobile station apparatus and method for retransmitting data in a reverse direction upon receiving a retransmission request for the data transmitted in the reverse direction from a bases station after transmitting the data in the reverse direction in a mobile communication system supporting hybrid automatic retransmission request (HARQ). The apparatus comprises a radio frequency (RF) receiver for receiving a retransmission control signal for the reverse data over a forward link; and a controller for determining whether to retransmit the reverse data using the retransmission control signal received from the RF receiver, and controlling transmission of retransmission data using a traffic-to-pilot power ratio (TPR) included in the retransmission control signal.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

Figure 1:
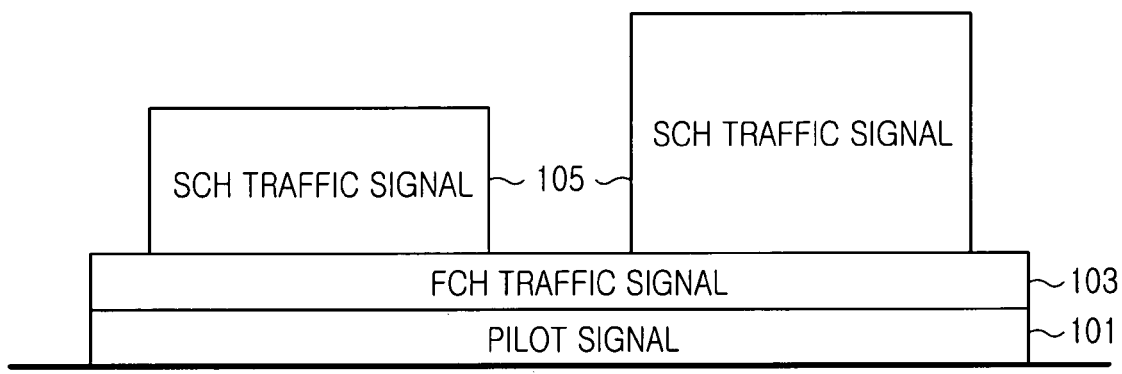
FIG. 1 is a diagram illustrating a structure of reverse channels in a CDMA2000 mobile communication system.

In the following description, a reverse supplemental channel (R-SCH) and a reverse fundamental channel (R-FCH) are channels for transmitting traffic and signaling information from a mobile station to a base station. A traffic-to-pilot power ratio (TPR) refers to a power ratio of a reverse fundamental channel or a reverse supplemental channel transmitted by a mobile station to a pilot signal. In addition, a structure of the reverse channels has been described with reference to FIG. 1.

Figure 3A:
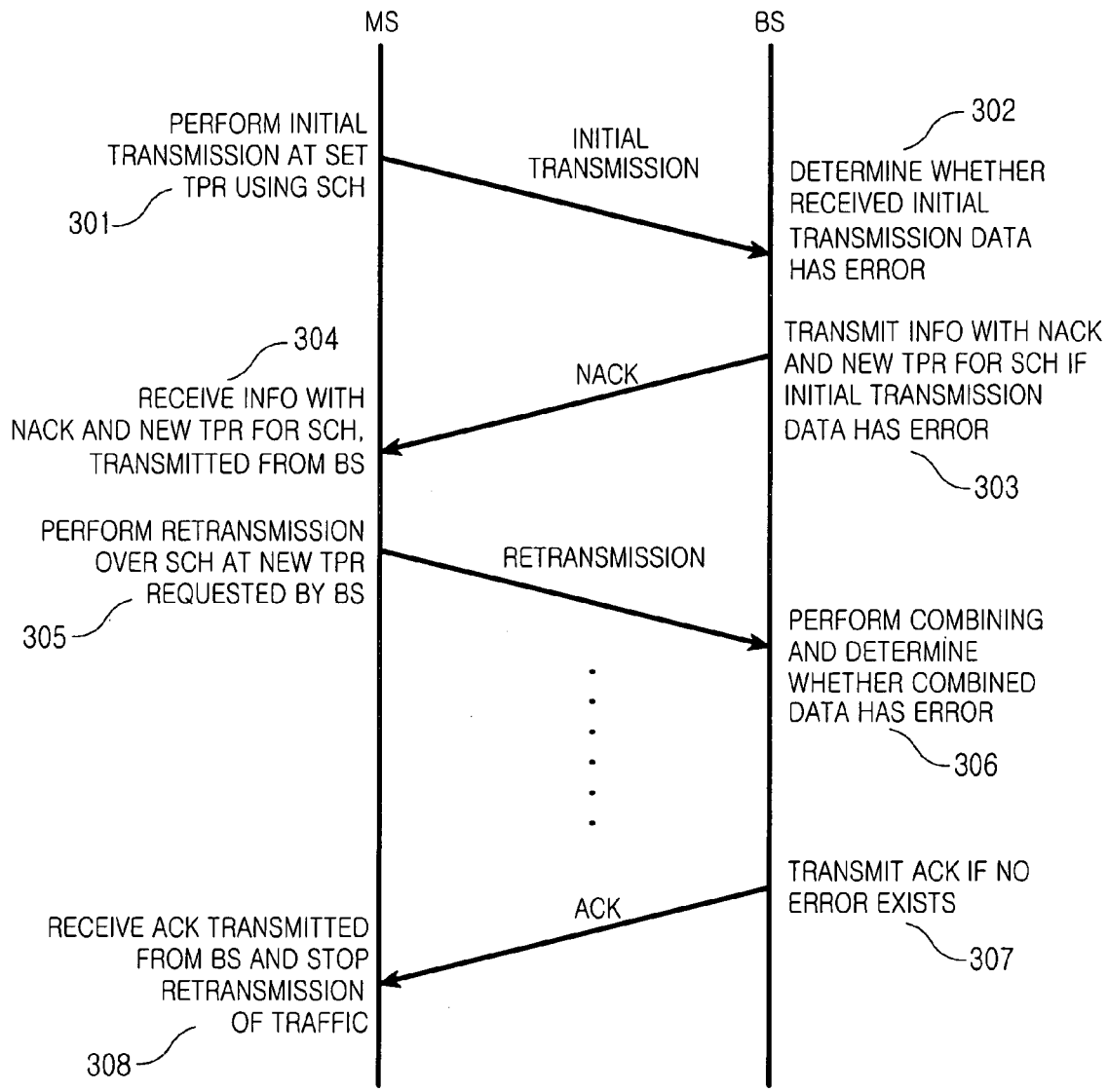
FIG. 3A is a signal flow diagram during reverse data transmission in a CDMA2000 mobile communication system supporting HARQ according to a first embodiment of the present invention.

FIG. 3A is a signal flow diagram during reverse data transmission in a CDMA2000 mobile communication system supporting HARQ according to a first embodiment of the present invention. When there is traffic data to be transmitted in a reverse direction, a mobile station initially transmits the traffic data over a supplemental channel according to a present TPR value in step 301. When performing initial transmission in this way, the mobile station can use a preset value as a TPR value of a supplemental channel 105. Table 1 below illustrates an example of TPR values for data rates in the supplemental channel 105, which can be used at initial transmission.

TABLE 1

| Data Rate of SCH | TPR |
|---|---|
| 19.2 Kbps | 5 dB |
| 38.4 Kbps | 7 dB |
| 76.8 Kbps | 8.5 dB |
| 153.6 Kbps | 9.5 dB |
| 307.2 Kbps | 11 dB |

If one of the data rates for the supplemental channel 105, illustrated in Table 1, is selected and initial transmission is performed at the selected data rate, then a base station receives the traffic data, and determines whether there is an error in the traffic data initially transmitted over the supplemental channel 105, in step 302. If there is an error, the base station performs step 303. Because FIG. 3A is a signal flow diagram based on HARQ, the description will be focused on the case where an error has occurred. That is, when no error has occurred, normal transmission is continued, so a description thereof will not be provided for simplicity.

As a result of the determination in step 302, if there is an error in the traffic data received over the reverse supplemental channel 105, the base station measures an Eb/Nt value of the supplemental channel 105. Thereafter, the base station compares the measured Eb/Nt value with a target Eb/Nt value of the supplemental channel 105, which is calculated at an outer loop set point, i.e., a predetermined threshold value in an outer loop power control system, performed in the base station. By comparing the Eb/Nt value measured from the supplemental channel 105 with the target Eb/Nt value calculated at the outer loop set point, the base station can calculate an Eb/Nt value additionally required when the mobile station retransmits traffic data over the supplemental channel 105. The base station can determine at which TPR value the mobile station should transmit traffic data over the supplemental channel 105 during retransmission, using the additionally required Eb/Nt value.

Figure 2:
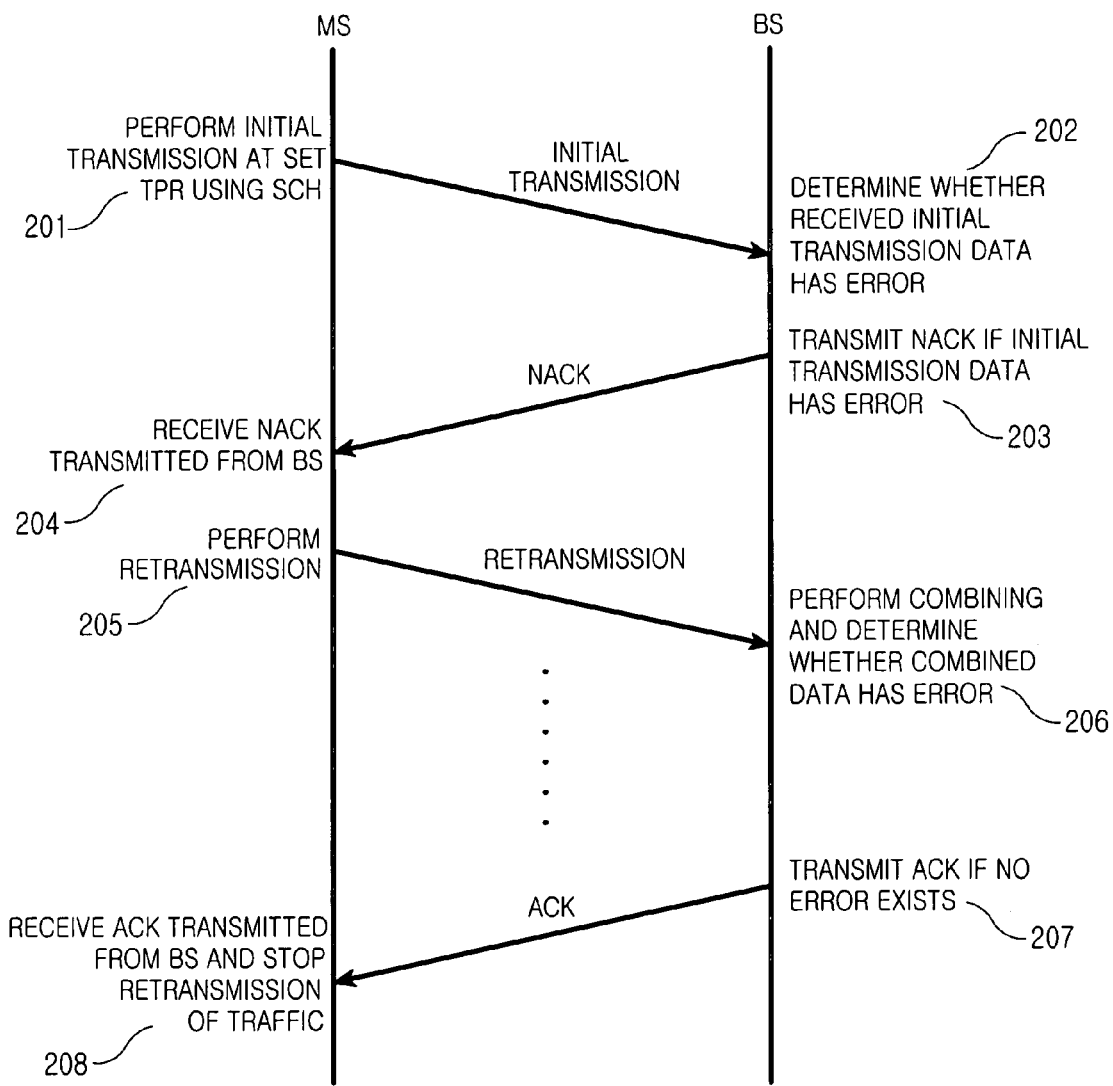
FIG. 2 is a signal flow diagram during reverse data transmission in a CDMA2000 mobile communication system supporting HARQ.

If a new TPR value is determined in step 302, the base station transmits the determined new TPR value together with a NACK signal indicating that there is an error in the traffic data transmitted over the supplemental channel 105 to the mobile station. Then the mobile station receives the NACK signal and the new TPR value transmitted by the base station in step 304. Upon receiving the new TPR value, the mobile station proceeds to step 305 where it retransmits the traffic data over the supplemental channel 105 according to the received TPR value. Here, for retransmission, a method of transmitting defective data until an ACK signal is received as described in conjunction with FIG. 2 can be used. Alternatively, a method of performing retransmission as many times as a predetermined number can be used.

In step 306, the base station combines the traffic data retransmitted over the reverse supplemental channel 105 with the traffic data initially transmitted in step 302. Further, the base station determines whether an error has occurred in the combined traffic data. If an error has occurred, the base station repeats the operations of steps 302 and 303. However, if no error has occurred in the combined traffic data, the base station proceeds to step 307 where it generates an ACK signal indicating "no error" and transmits the ACK signal over a given forward channel to a mobile station that transmitted the traffic data over the reverse supplemental channel 105.

Upon receiving the ACK signal indicating that there is no error in the traffic data transmitted over the reverse supplemental channel 105, the mobile station ends the retransmission operation for the traffic data being retransmitted, in step 308.

As described above, when an error has occurred in traffic data transmitted over a reverse supplemental channel, it is possible to increase a retransmission success rate, minimize reverse interference, and properly control reverse transmission power, by newly setting a TPR value to be used at retransmission on the basis of an Eb/Nt value of the supplemental channel.

Figure 3B:
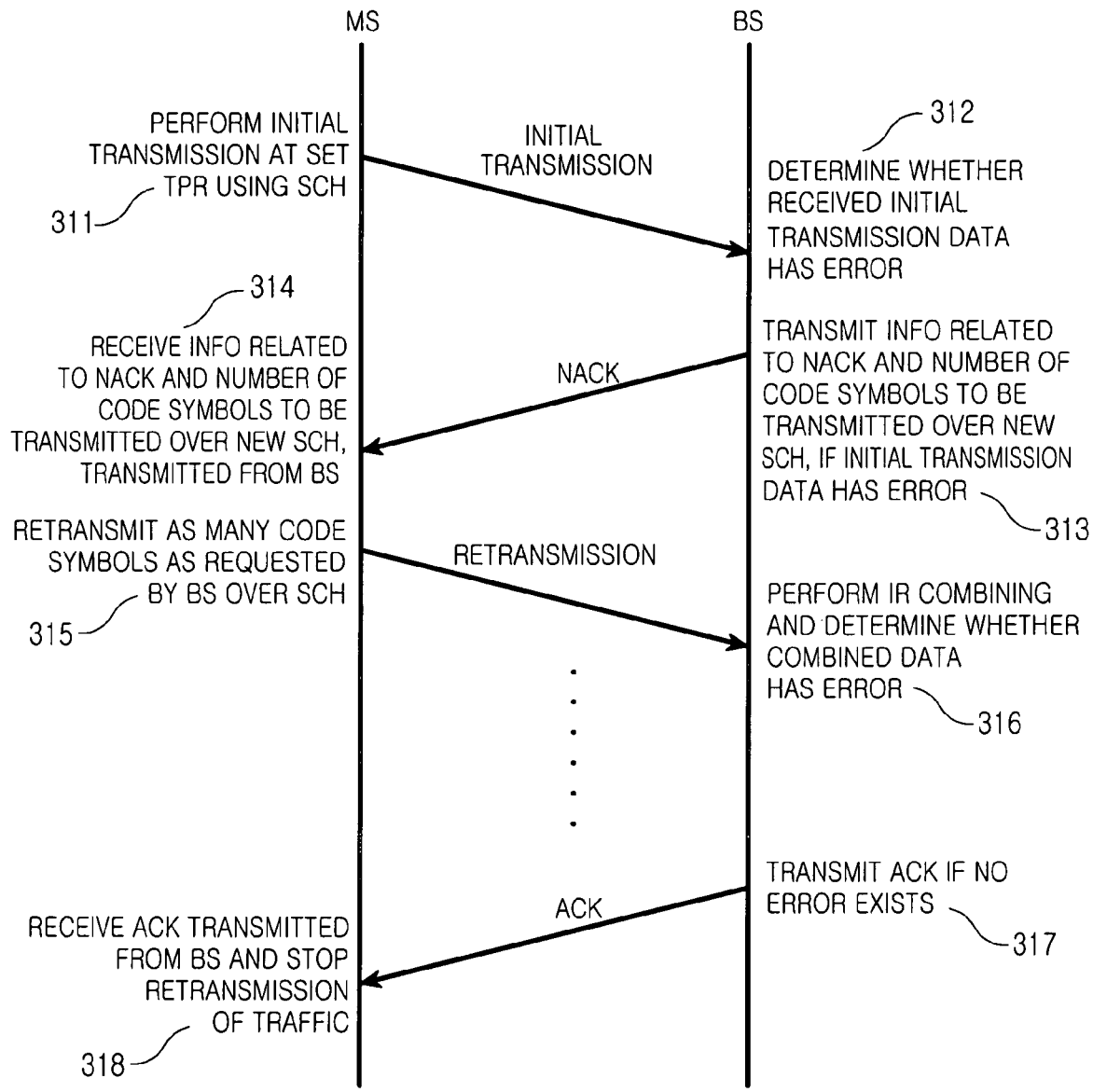
FIG. 3B is a signal flow diagram during reverse data transmission in a CDMA2000 mobile communication system supporting HARQ according to a second embodiment of the present invention.

FIG. 3B is a signal flow diagram during reverse data transmission in a CDMA2000 mobile communication system supporting HARQ according to a second embodiment of the present invention. When there is data to be transmitted in a reverse direction, a mobile station initially transmits the data over a supplemental channel according to a present TPR value in step 311. This is identical to the initial transmission described in conjunction with FIG. 2. When performing initial transmission in this way, the mobile station performs transmission using predetermined values for not only TPR of a supplemental channel, but also the number of transmission code symbols. When initial transmission is performed in this way, the base station receives the data and in step 312, the base station determines whether there is an error in the data initially transmitted over the supplemental channel. If there is an error, the base station performs step 313. Again, because FIG. 3B is a signal flow diagram based on HARQ, the description will be focused on the case where an error has occurred. That is, when no error has occurred, normal transmission is continued, so a description thereof will not be provided for simplicity.

If it is determined that an error has occurred in the initially-transmitted data, the base station measures an Eb/Nt value of the supplemental channel received from the mobile station in step 313. Further, in step 313, the base station compares the measured Eb/Nt value with a target Eb/Nt value of the supplemental channel, calculated at a current outer loop set point. By comparing the measured Eb/Nt value with the target Eb/Nt value, the base station calculates in step 313 an Eb/Nt value required when the mobile station performs retransmission. In addition, the base station calculates how many code symbols it will transmit over the supplemental channel during retransmission as well as the Eb/Nt value necessary for retransmission. Moreover, when an IR scheme is used during retransmission, information including a retransmission position of a code symbol is also transmitted. When a position of a retransmission symbol is not transmitted, a symbol starting at a point previously appointed by the base station and the mobile station can be transmitted. After the calculation, in step 313, the base station transmits information including the calculated Eb/Nt value and the number of symbols to be transmitted over the supplemental channel or a symbol in a position to be transmitted during retransmission, along with a NACK signal, to the mobile station.

Therefore, in step 314, the mobile station receives the NACK signal including the newly calculated Eb/Nt value and the number of transmission symbols from the base station.

Upon receiving the NACK signal, the mobile station proceeds to step 315 where it retransmits as many code symbols in the initially-transmitted data as the number requested by the base station, over the supplemental channel. Here, retransmission code symbols can be composed of code symbols after the initially-transmitted code symbol according to the IR scheme.

Figure 8:
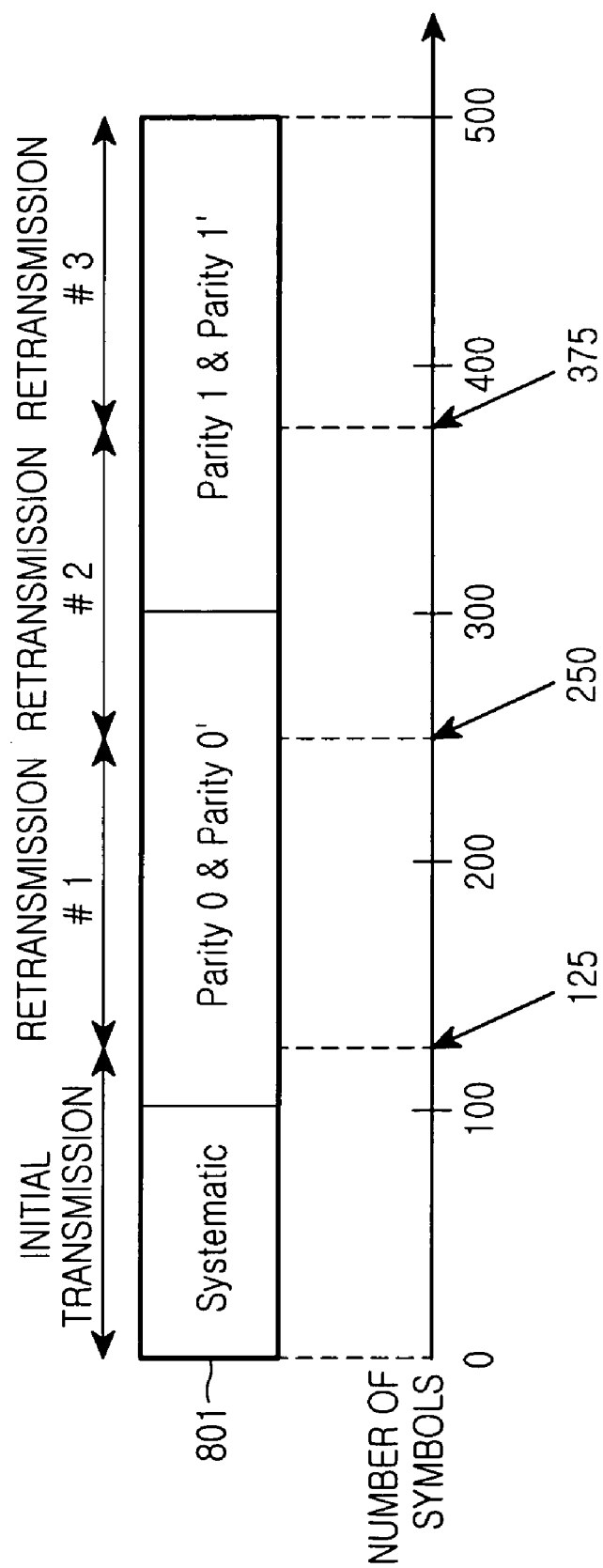
FIG. 8 is a diagram illustrating a transmission scheme of code symbols demonstrating performance improvement by IR.

FIG. 8 is a diagram illustrating a transmission scheme of code symbols for explaining performance improvement by IR. In FIG. 8, code symbols 801 include code symbols obtained by encoding 100 information bits at a code rate of ⅕ by a turbo encoder. The code symbols are roughly divided into a systematic part and a parity part. The systematic part has 100 code symbols, which are identical in number to the information bits, and the parity part includes 400 code symbols because the code rate is ⅕. Therefore, the code symbols 801 include a total of 500 code symbols. A description will now be made of a method for transmitting such code symbols.

In general transmission, if 125 symbols are transmitted during an initial transmission, 100 symbols of the systematic part and 25 symbols of the parity part are transmitted. That is, $0^{th}$ to $124^{th}$ symbols are transmitted at initial transmission. Thereafter, if retransmission is requested, $0^{th}$ to $124^{th}$ symbols are transmitted as done at the initial transmission. Therefore, an actual code rate of the transmitted data becomes 100/125=0.8. Therefore, although Eb/Nt received at every retransmission is increased, the code rate is maintained.

If the IR method is used, initial transmission is performed in the same method as described above. However, if retransmission is requested, $125^{th}$ to $249^{th}$ symbols indicated by Retransmission #1 are transmitted. In addition, if next retransmission is requested, $250^{th}$ to $374^{th}$ symbols indicated by Retransmission #2 are transmitted. Further, if retransmission is requested again, $375^{th}$ to $500^{th}$ symbols indicated by Retransmission #3 are transmitted. When transmission is performed in this manner, an increase in the number of retransmissions causes a decrease in a code rate. As a result, in a receiver, the retransmission leads to an increase in Eb/Nt and a decrease in a code rate. Because a lower code rate at the same Eb/Nt improves performance, the foregoing method contributes performance improvement.

In addition, a mobile station readjusts a TPR value so that when transmitting the code symbols, a ratio Eb/Nt of energy to interference per symbol is constant. When the mobile station readjusts a TPR value in this manner, a new TPR value is determined according to the number of code symbols. For example, if TPR used at initial transmission is 10 dB and the number of code symbols transmitted at retransmission is 50% of those transmitted at initial transmission, a new TPR of retransmission is adjusted to 7 dB.

The mobile station retransmits traffic data over the supplemental channel at the readjusted TPR value. In step 316, the base station receives the retransmitted traffic data, performs IR combining on the received traffic data, and determines whether there is an error in the IR-combined traffic data. If it is determined that there is no error, the base station transmits an ACK signal indicating "no error" to the mobile station in step 317. Upon receiving the ACK signal from the base station, in step 318, the mobile station ends retransmission of the traffic data where were being retransmitted over the supplemental channel. As described above in conjunction with FIG. 2, the mobile station can stop retransmission upon receiving an ACK signal or after performing the retransmission as many times as the predetermined number of retransmissions.

When retransmission is performed in this manner, it is possible to adjust reception performance to a specific level or higher while minimizing reverse interference by optimizing transmission power allocated to a supplemental channel during retransmission.

Figure 4A:
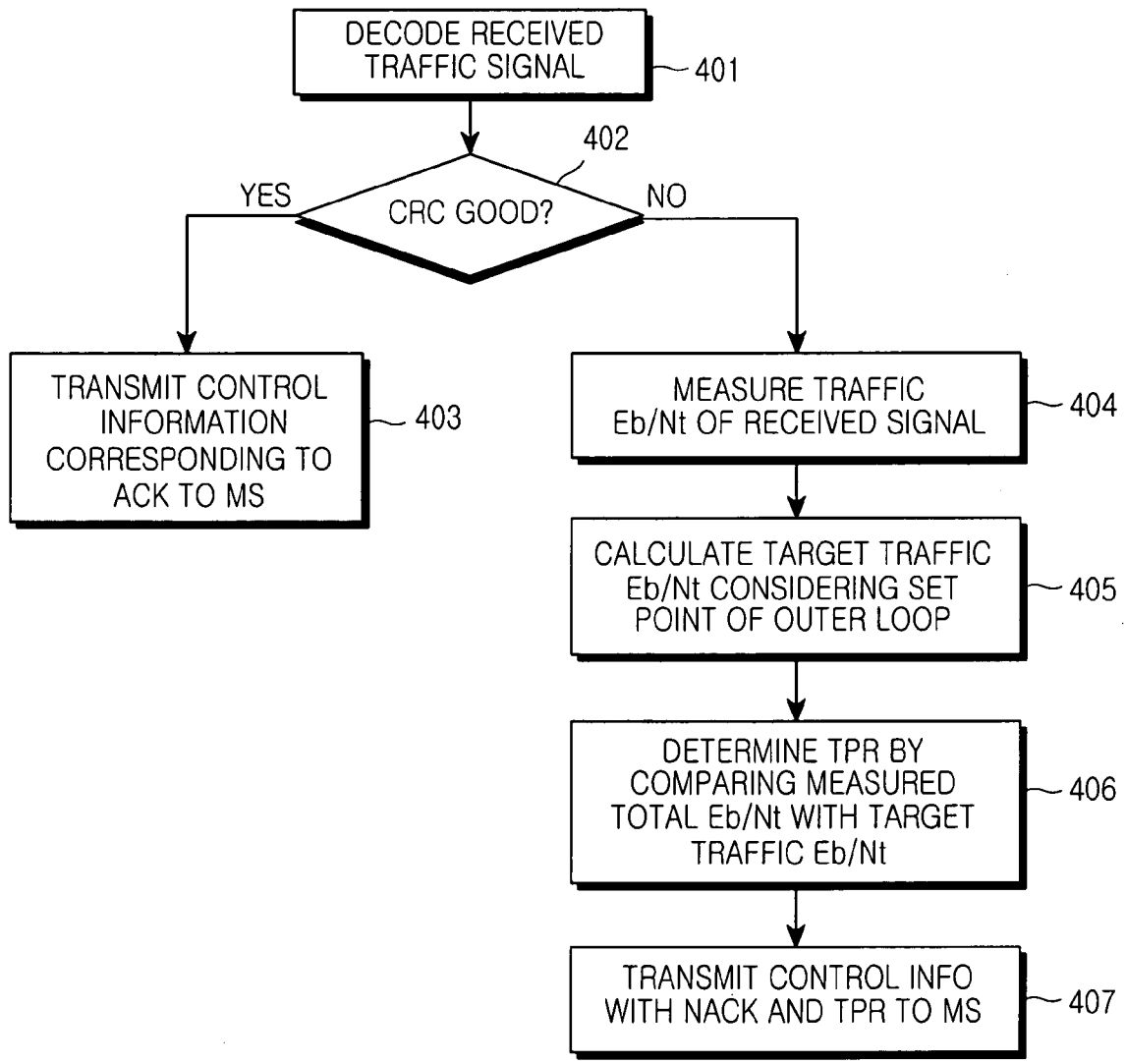
FIG. 4A is a flowchart for controlling retransmission of a reverse link by a base station applying HARQ according to a third embodiment of the present invention.

FIG. 4A is a flowchart for controlling retransmission of a reverse link by a base station applying HARQ according to a third embodiment of the present invention. If traffic data is received over a supplemental channel, a base station decodes the received traffic signal in step 401. Thereafter, in step 402, the base station performs CRC (Cyclic Redundancy Code) check on the decoded traffic data. The CRC check is a process of determining whether an error has occurred in the data decoded after being received over the supplemental channel. If it is determined in step 402 that an error has occurred, the base station proceeds to step 404. Otherwise, if no error has occurred, the base station proceeds to step 403 where it transmits an ACK signal indicating that the received traffic data is excellent, to a mobile station that transmitted the traffic data over the supplemental channel.

In step 404, the base station measures an Eb/Nt value of the supplemental channel over which the traffic data was transmitted. The Eb/Nt value of the supplemental channel can be measured in the following method. The base station measures a power value of a pilot signal received over a reverse pilot channel that is simultaneously received at a time when the supplemental channel over which the traffic data is transmitted is received. It is possible to obtain a TPR value used for the supplemental channel 105 by applying the TPR value used for the pilot channel. After measuring the Eb/Nt value of the traffic channel, the base station proceeds to step 405 where it calculates a target Eb/Nt value of the supplemental channel 105, which is desired to be obtained in outer loop power control. A method for calculating the target Eb/Nt value of the supplemental channel 105 uses a set point of outer loop power control performed by the base station, and the applied TPR value. Thereafter, the base station determines an Eb/Nt value additionally required at retransmission in order to satisfy the target Eb/Nt value of the supplemental channel 105. A TPR value at retransmission is determined using the additionally required Eb/Nt value.

Here, the TPR value is determined on the basis of the above-stated Eb/Nt value additionally required at retransmission, and in order to satisfy the Eb/Nt, the base station can determine the TPR value by comparing the Eb/Nt value of the supplemental channel 105, measured in step 404, with the target Eb/Nt value of the supplemental channel 105, calculated in step 405. That is, in step 406, the base station can determine a TPR value to be applied by the mobile station during retransmission on the basis of a difference between the measured Eb/Nt value and the target Eb/Nt value.

A description will now be made of a method for determining a TPR value according to an embodiment of the present invention.

Method for Determining TPR by a BS (1) When a value determined by dividing a total reception Eb/Nt by a target Eb/Nt is larger than or equal to 1, a new TPR value to be used during retransmission is determined as ¼ of an old TPR value.

(2) When a value determined by dividing the total reception Eb/Nt by a target Eb/Nt is larger than or equal to 0.5 and smaller than 1, a new TPR value to be used during retransmission is determined as ½ of an old TPR value.

(3) When a value determined by dividing the total reception Eb/Nt by a target Eb/Nt is smaller than 0.5, a new TPR value to be used during retransmission is determined as the same value as an old TPR value.

The total Eb/Nt value, the target Eb/Nt value, the new TPR value, and the old TPR value, used in this method, are all linear scale values. In addition, in the case of an initial transmission, the reception Eb/Nt value used in step 406 becomes an Eb/Nt value of the supplemental channel 105 received during the initial transmission. In contrast, in the case of a retransmission, the reception Eb/Nt value becomes the total Eb/Nt value received at initial transmission and retransmission. That is, when retransmission is performed even once, the reception Eb/Nt value compared with the target Eb/Nt value in step 406 becomes a total Eb/Nt value currently transmitted for the traffic data.

If a new TPR value required during retransmission is determined in the above or other method, the base station proceeds to step 407 where it forms control information using the TPR value generated in step 406. Thereafter, the base station transmits the control information to the mobile station along with a NACK signal indicating that an error has occurred in the transmitted traffic data.

Figure 4B:
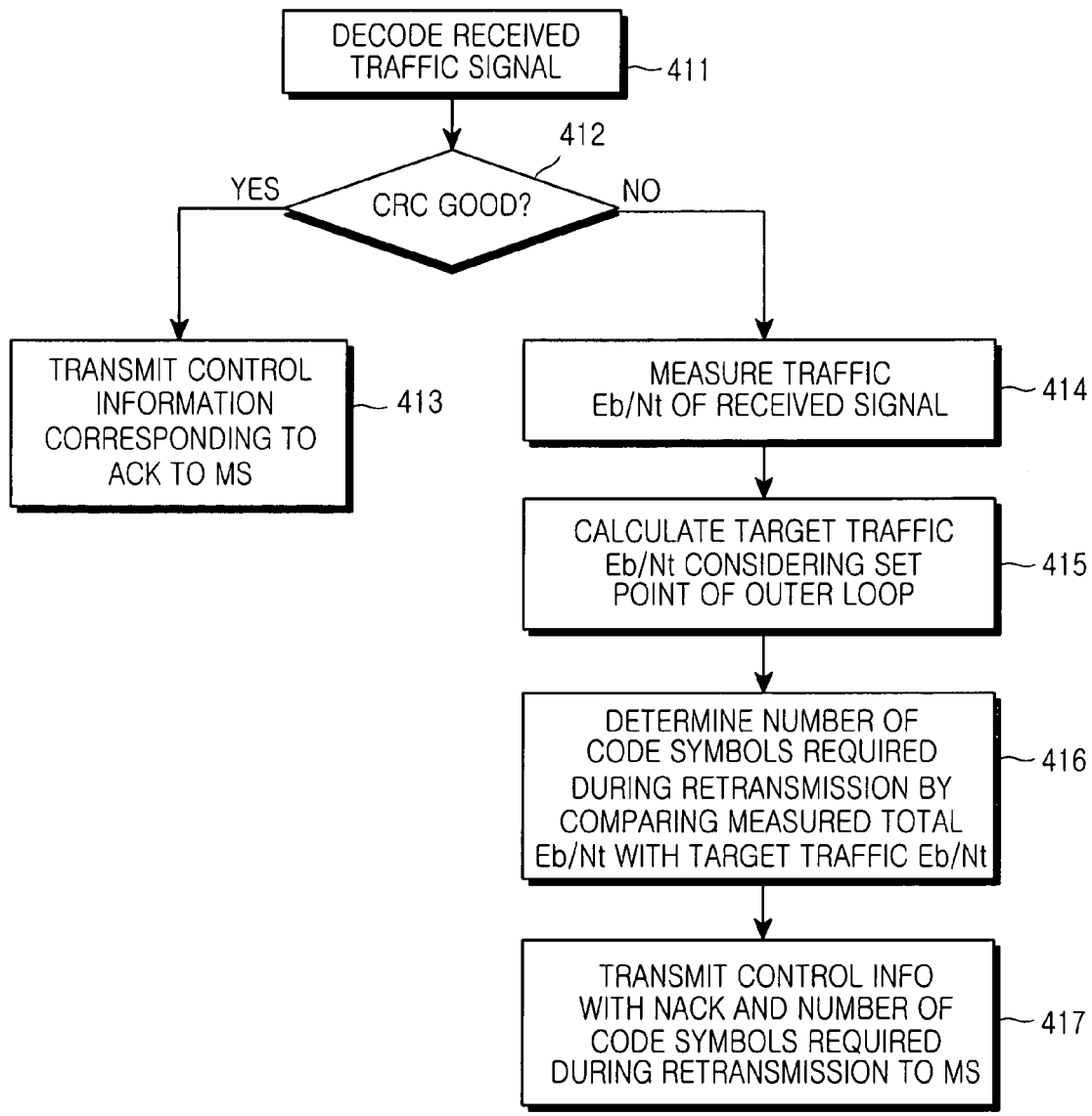
FIG. 4B is a flowchart for controlling retransmission of a reverse link by a base station applying HARQ according to a fourth embodiment of the present invention.

FIG. 4B is a flowchart for controlling retransmission of a reverse link by a base station applying HARQ according to a fourth embodiment of the present invention. If data is received over a supplemental channel, a base station decodes the received signal in step 411. The data can be either traffic data or control data. Thereafter, in step 412, the base station performs CRC check on the decoded data. If it is determined in step 412 that an error has occurred, the base station proceeds to step 414. Otherwise, if no error has occurred, the base station proceeds to step 413 where it transmits an ACK signal indicating that the received data is excellent, to a mobile station that transmitted the data over the supplemental channel.

In step 414, the base stations measures an Eb/Nt value of the supplemental channel over which the data was transmitted. The Eb/Nt value of the supplemental channel can be measured in the following method. The base station measures a power value of a pilot signal received over a reverse pilot channel that is simultaneously received at a time when the supplemental channel over which the data is transmitted is received. Because transmission power of the pilot channel is determined by a TPR value, the base station can detect a TPR value applied to the pilot channel according to a measured power value of the pilot channel. Transmission power of the supplemental channel is determined by a TPR value applied to the pilot channel, and as a result the base station can measure an Eb/Nt value for the supplemental channel.

After measuring the Eb/Nt value of the supplemental channel in step 414, the base station proceeds to step 415 where it calculates a target Eb/Nt value of the supplemental channel, which is desired to be obtained in outer loop power control. A method for calculating the target Eb/Nt value of the supplemental channel uses a set point of outer loop power control performed by the base station, and the TPR value applied to the supplemental channel. Thereafter, in step 416, the base station determines the number of code symbols necessary during retransmission by comparing the total Eb/Nt value measured in step 414 with the target Eb/Nt value, calculated in step 415, of data that must be retransmitted over the supplemental channel. In addition, when the IR scheme is used, a symbol start position of retransmission data is determined during retransmission. Here, the "measured total Eb/Nt value" is defined as follows.

When an Eb/Nt value of a defective supplemental channel is generated at initial transmission, the measured total Eb/Nt value is an Eb/Nt value measured during initial transmission. However, when retransmission is performed even once after initial transmission, the measured total Eb/Nt value becomes the total Eb/Nt value received at from initial transmission to all retransmissions. That is, when retransmission is performed even once, a reception Eb/Nt value compared with the target Eb/Nt value is the total Eb/Nt value determined by summing up Eb/Nt values at initial transmission and all retransmissions.

Method for Determining a Number of Retransmission Code Symbols by a BS (1) When (total reception Eb/Nt÷target Eb/Nt)≧1, 25% of the code symbols transmitted at initial transmission is transmitted during retransmission.

(2) When 0.5≦(total reception Eb/Nt÷target Eb/Nt)<1, 50% of the code symbols transmitted at initial transmission is transmitted during retransmission.

(3) When (total reception Eb/Nt÷target Eb/Nt)≧0.5, 100% of the code symbols transmitted at initial transmission is transmitted during retransmission.

The total Eb/Nt value and the target Eb/Nt value, used in this method, are all linear scale values.

When the number of code symbols necessary during retransmission is determined in this way, the base station proceeds to step 417, where it forms control information using the number of code symbols necessary during retransmission and a NACK signal indicating that an error has occurred in the data received the supplemental channel, and then transmits the control information to the mobile station.

Figure 5A:
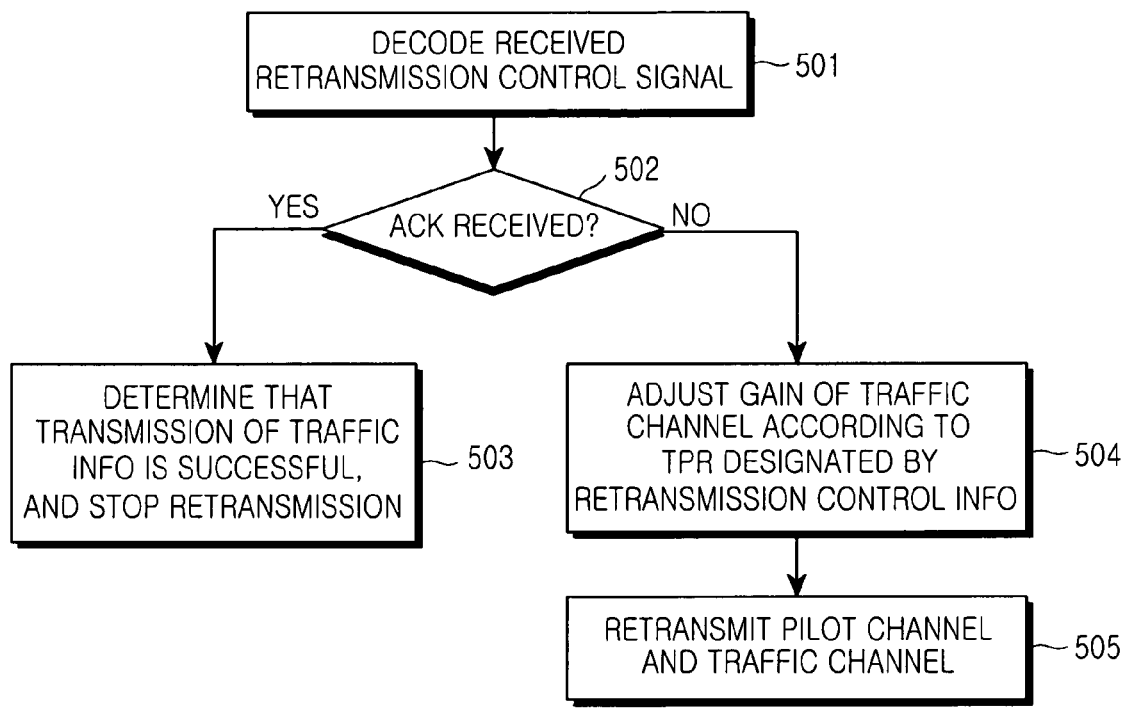
FIG. 5A is a flowchart for controlling retransmission of a reverse link by a mobile station applying HARQ according to a fifth embodiment of the present invention.

FIG. 5A is a flowchart for controlling retransmission of a reverse link by a mobile station applying HARQ according to a fifth embodiment of the present invention. If an error occurs in traffic data that has been initially transmitted or retransmitted over a reverse link, a base station transmits a TPR value necessary during retransmission of defective traffic data and a NACK signal for requesting retransmission, as described in conjunction with FIG. 4A. Then the mobile station decodes received control information in step 501. Thereafter, the mobile station determines in step 502 whether the decoded control information includes an ACK signal indicating that there is no error in the traffic data transmitted over the supplemental channel or a NACK signal indicating that an error has occurred in the transmitted traffic data. If it is determined in step 502 that an ACK signal has been received, the mobile station proceeds to step 503 where it determines that transmission of the corresponding traffic data is successful, and performs a corresponding routine.

Otherwise, if it is determined in step 502 that a NACK signal indicating that there is an error in the traffic data transmitted over the supplemental channel has been received, the mobile station proceeds to step 504. In step 504, the mobile station controls a gain of the supplemental channel 105 for transmitting traffic data according to a TPR designated by a retransmission control signal. When such gain control is achieved, power values of a supplemental channel 105, a fundamental channel 103, and a pilot channel 101 are determined. Therefore, in step 505, the mobile station transmits signals over the supplemental channel 105, the fundamental channel 103, and the pilot channel 101 according to the determined power values. At this point, data transmitted over the supplemental channel 105 becomes HARQ retransmission traffic data.

Figure 5B:
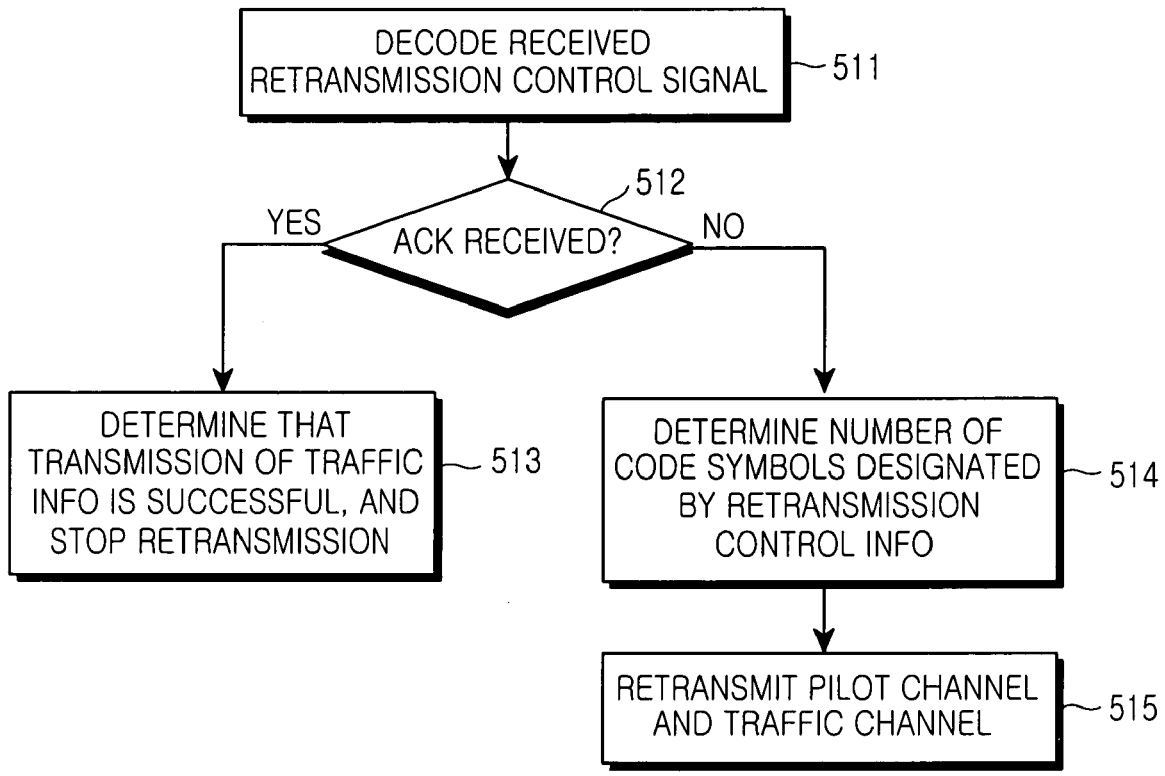
FIG. 5B is a flowchart for controlling retransmission of a reverse link by a mobile station applying HARQ according to a sixth embodiment of the present invention.

FIG. 5B is a flowchart for controlling retransmission of a reverse link by a mobile station applying HARQ according to a sixth embodiment of the present invention. If an error occurs in data that has been initially transmitted or retransmitted over a reverse link, a base station transmits the number of symbols required during retransmission of defective traffic data and a NACK signal for requesting retransmission, as described in conjunction with FIG. 4B. Then the mobile station decodes received control information in step 511. When performing retransmission using the IR scheme, the mobile station can receive control information including a symbol start position determined by the base station. Such control information can be included in a NACK signal before being transmitted, or can be transmitted over a separate channel. Thereafter, the mobile station determines in step 512 whether the decoded control information includes an ACK signal indicating that there is no error in the data transmitted over the supplemental channel or a NACK signal indicating that an error has occurred in the transmitted data. If it is determined in step 512 that an ACK signal has been received, the mobile station proceeds to step 513 where it determines that transmission of the corresponding traffic data is successful, and performs a corresponding routine.

However, if it is determined in step 512 that a NACK signal has been received, the mobile station proceeds to step 514 where it analyzes retransmission control information received together with the NACK signal. The mobile station controls a gain of code symbols, the number of which is designated by the retransmission control information. Here, the gain control refers to setting transmission power of a supplemental channel by the base station so that retransmitted code symbols are received at the same Eb/Nt. That is, the mobile station determines a constant ratio of supplemental channel transmission power to pilot channel transmission power. If power of the supplemental channel is determined in this manner, the mobile station proceeds to step 515 where it transmits a pilot signal over the pilot channel. At the same time, the mobile station retransmits as many code symbols as the number determined in step 514 over the supplemental channel at the power determined in step 514.

Here, in order to use IR combining for retransmission between a mobile station and a base station, symbols transmitted at initial transmission should not overlap with symbols transmitted at retransmission. This prevents overlapping of the data transmitted after initial transmission, as described in conjunction with FIG. 8. Describing this with reference back to FIG. 8, the initial transmission part of FIG. 8 is transmitted at initial transmission, a retransmission#1 part is transmitted during first retransmission, and a retransmission#2 part is transmitted during second retransmission. That is, the entire code symbols are divided by predetermined number and transmitted so that they are not overlapped. In addition, a start point and a last point of code symbols transmitted, when retransmitted by IR, are previously set between the base station and the mobile station.

A method of appointing a start point of the retransmission code symbol can be divided into the following three methods. First, a base station appoints a start point and then notifies a mobile station of the appointed start point. Second, a mobile station determines a start point and then informs a base station of the determined start point. Third, a base station and a mobile station independently determine a start point according to a particular rule. Importantly, the mobile station and the base station should always share a start point of a retransmission code symbol.

Figure 6:
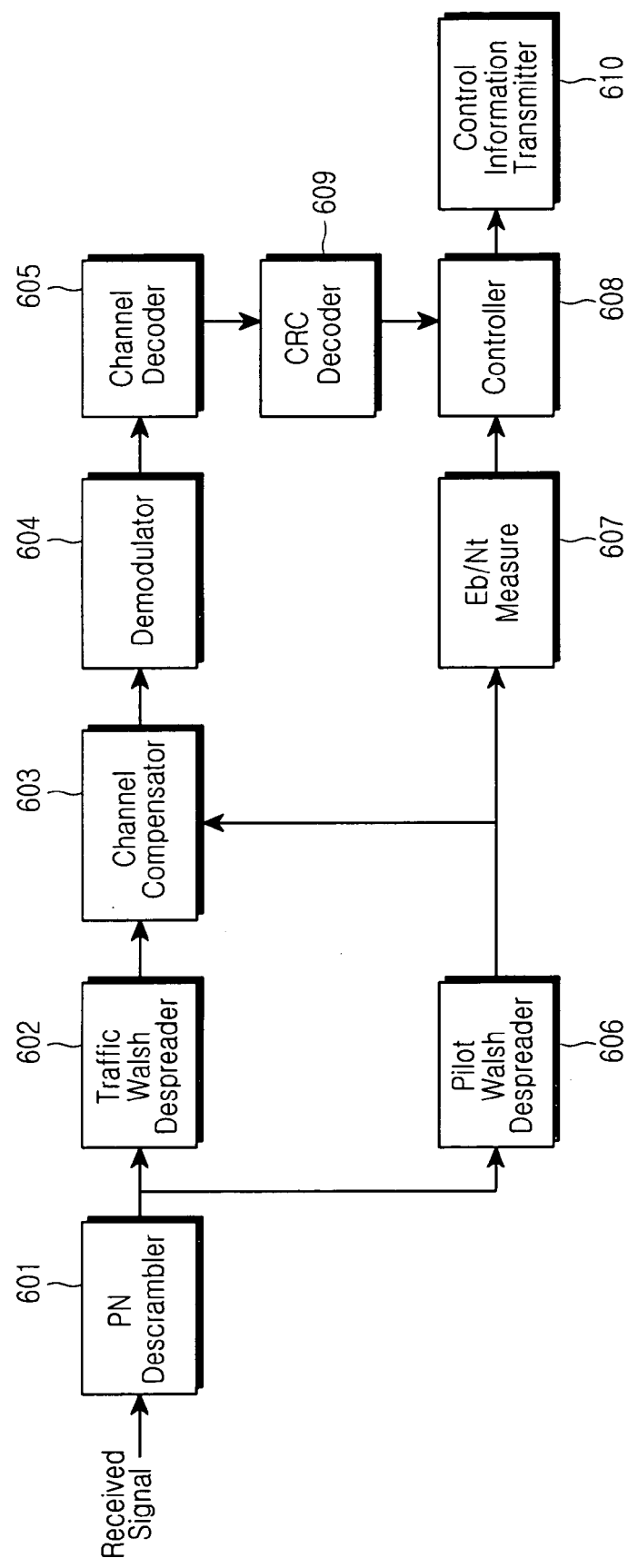
FIG. 6 is a block diagram of a base station transceiver for HARQ reverse data transmission according to a seventh embodiment of the present invention.

FIG. 6 is a block diagram of a base station transceiver for HARQ reverse data transmission according to an embodiment of the present invention. A descrambler 601 descrambles a signal received over a reverse link, and outputs the descramble signal to a traffic Walsh despreader 602 and a pilot Walsh despreader 606. The traffic Walsh despreader 602 Walsh-despreads a traffic signal received over a fundamental channel and a supplemental channel, and the pilot Walsh despreader 606 Walsh-despreads a pilot signal received over a pilot channel. The despread pilot signal is input to a channel compensator 603 and an Eb/Nt calculator 607.

The channel compensator 603 channel-compensates a signal received over a traffic channel and a signal received over a pilot channel, and outputs the channel-compensated signals to a demodulator 604. At this point, channel compensation is performed on data received over the traffic channel, using a channel estimation value calculated from a signal received from the pilot channel. The channel-compensated signal is demodulated by the demodulator 604 and then decoded by a channel decoder 605. The signal decoded by the channel decoder 605 is input to a CRC checker 609 for a CRC check. The CRC check determines whether an error has occurred in data received over a traffic channel such as the fundamental channel and the supplemental channel. The CRC checker 609 provides a controller 608 with a CRC check signal indicating whether an error has occurred in data received over the traffic channel.

The Eb/Nt calculator 607 measures a ratio Eb/Nt of energy to interference per data bit of a supplemental channel using the received pilot signal. The Eb/Nt of a supplemental channel is measured by measuring a signal-to-interference ratio of a received pilot signal, and then calculating Eb/Nt of a supplemental channel by applying a TPR and a spreading factor of the supplemental channel to the measured signal-to-interference ratio of the pilot signal. The Eb/Nt calculator 607 outputs the measured Eb/Nt value to the controller 608.

The controller 608 will be separately described for two different embodiments. First, the controller 608 will be described for an embodiment, in which when an error has occurred in traffic data received over a supplemental channel 105, the controller 608 receives an Eb/Nt value for the supplemental channel 105 from the Eb/Nt calculator 607 and determines a TPR value to be used during retransmission. The TPR value can be determined by either "Method for Determining TPR by a BS" described in conjunction with FIG. 4A, or the other method. When the TPR value to be used during retransmission is determined, the controller 608 creates control information using the determined TPR value, and then outputs the created control information to a control information transmitter 610 together with a NACK signal indicating that an error has occurred in the traffic data. The control information transmitter 610 then transmits the control information and the NACK signal to a mobile station over a given forward channel.

The controller 608 according to the other embodiment performs a control operation of generating control information for requesting retransmission or outputting ACK information indicating that there is no error in received data, based on a CRC check signal received from the CRC checker 609.

A description will now be made of an operation performed when a CRC check signal indicating an occurrence of an error is provided to the controller 608.

When an error has occurred in data received over the supplemental channel, the controller 608 determines the number of code symbols to be retransmitted, based on the Eb/Nt value calculated by the Eb/Nt calculator 607. Here, the number of code symbols to be retransmitted can be determined by "Method for Determining a Number of Retransmission Code Symbols by a BS" described above. However, the number of code symbols to be retransmitted can also be determined in a method other than the above method.

When the number of code symbols to be retransmitted is determined in this manner, the controller 608 outputs information on the number of retransmission code symbols to the control information transmitter 610. The control information transmitter 610 performs a mapping operation according to a sequence agreed between the base station and the mobile station, and transmits the mapping result to the mobile station over a forward channel. At this point, information transmitted to the mobile station becomes a NACK signal indicating that an error has occurred in received data, and information indicating the number of specific code symbols, calculated by the controller 608.

Figure 7:
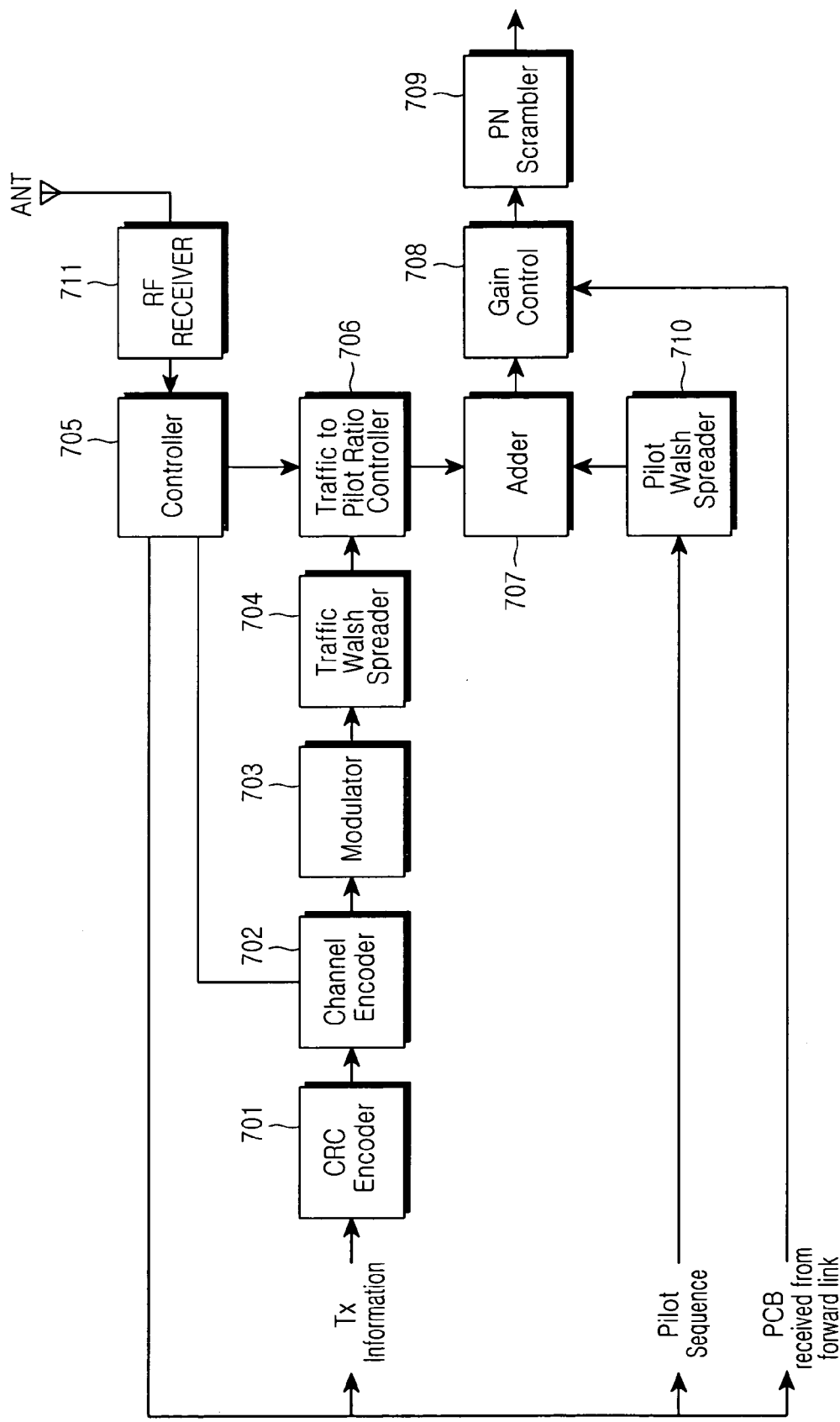
FIG. 7 is a block diagram of a mobile station transceiver for HARQ reverse data transmission according to an eighth embodiment of the present invention.

FIG. 7 is a block diagram of a mobile station transceiver for HARQ reverse data transmission according to an embodiment of the present invention. A base station transmits ACK/NACK information for data transmitted over a reverse channel, through a given forward channel. A mobile station then receives the information through a radio frequency (RF) receiver 711, performs descrambling, despreading, demodulation, and decoding on the received information, and provides its output to a controller 705. Such an RF receiver includes an antenna for receiving an RF signal, and a baseband converter for downconverting the received RF signal into a baseband signal. In addition, since the baseband signal is an analog signal, the analog signal must be converted into a digital signal. Therefore, the RF receiver includes an analog-to-digital converter for converting the baseband analog signal into a digital signal. Such details are general matters in a digital radio mobile communication system, so these are not illustrated in the drawing, for simplicity. Then the controller 705 determines whether an error has occurred in data transmitted over a reverse traffic channel in the received signal. If it is determined that an error has occurred in the data transmitted over a reverse channel, the controller 705 performs a control operation for retransmission. When retransmission is not required, if there is data to transmit, the controller 705 transmit the data, and if there is no data to transmit, the controller 705 ends data transmission.

A first embodiment and a second embodiment of the controller 705 will be separately described with reference to FIG. 7.

In the first embodiment, if retransmission is requested, the controller 705 outputs retransmission traffic data and reverse pilot sequence information, and outputs power control information based on a power control bit (PCB) received over a forward link via the RF receiver 711. In addition, the controller 705 determines a TPR value to be used during retransmission depending on the information received from the RF receiver 711. A method for determining a TPR value by the mobile station will be described below.

Method for Determining TPR Value by an MS (1) When an erasure occurs in received retransmission control information, a new TPR value is determined as ½ of an old TPR value.

(2) When no erasure occurs in received retransmission control information, a TPR value determined by the TPR determination method according to the first embodiment is determined as a TPR value of a traffic channel transmitted over a forward channel.

The term "erasure" used in this method means that reception power of received retransmission control information is low. As a result, reliability is also low. That is, in the above method, if it is determined that reliability of received retransmission control information is high, the mobile station performs retransmission using a TPR indicated by the received retransmission control information. However, if it is determined that the reliability of retransmission control information is low, the mobile station performs retransmission using a preset value.

If a TPR value required during retransmission is determined in this manner, the controller 705 outputs the determined TPR value to a TPR controller 706. In addition, the controller 705 outputs new traffic data necessary for initial transmission in the case of initial transmission, and transmits retransmission-requested traffic data in the case of retransmission. Moreover, during initial transmission, the controller 705 controls a channel encoder 702 so that initial transmission symbols are output. In the case of retransmission, the controller 705 controls the channel encoder 702 so that symbols necessary during retransmission are output. In the following description, a signal for controlling the symbols output from the controller 705 will be referred to as a "symbol transmission control signal."

A CRC encoder 701 CRC-encodes traffic data output from the controller 705. The present invention will be described on the assumption that traffic data output from the controller 705 is traffic data to be retransmitted (or retransmission traffic data). Therefore, after CRC-encoding retransmission traffic data, the CRC encoder 701 outputs the CRC-encoded retransmission traffic data to the channel encoder 702. The channel encoder 702 channel-encodes the encoded traffic data output from the CRC encoder 701. In addition, the channel encoder 702 determines output symbols based on a symbol transmission control signal output from the controller 705. Here, the channel encoder 702 performs encoding at a code rate of 0.2. For example, when the number of traffic data bits is 100, the number of symbols generated by the channel encoder 702 is 500 because the code rate is 0.2. From the generated 500 symbols, the number of initial transmission symbols and the number of retransmission symbols are separately determined.

Herein, the description has been made with reference to the code rate of 1/5, or 0.2, used in a CDMA2000 system. However, it should be noted that the code rate can be set to a different value in a different system.

Referring back to FIG. 7, a predetermined number of symbols output under the control of the controller 705, after being encoded by the channel encoder 702, are input to a modulator 703. The modulator 703 modulates the symbols output from the channel encoder 702. The modulated symbols output from the modulator 703 are Walsh-spread by a traffic Walsh spreader 704 with a Walsh code for traffic transmission. The spread symbols output from the traffic Walsh spreader 704 are input to the TPR controller 706. The TPR controller 706 multiplies the Walsh-spread output symbols by a predetermined gain value based on a TPR control signal output from the controller 705. At this point, if the current transmission is an initial transmission, a gain value for the initial transmission is multiplied, and if the current transmission is a retransmission, a gain value for the retransmission is multiplied. The gain-multiplied symbols output from the TPR controller 706 are input to an adder 707.

A pilot sequence output from the controller 705 is input to a pilot Walsh spreader 710. The pilot Walsh spreader 710 Walsh-spreads the pilot sequence signal with a Walsh code for transmitting a pilot signal, and provides its output to the adder 707. The adder 707 then adds a signal output from the TPR controller 706 to a signal output from the pilot Walsh spreader 710, and provides its output to a gain controller 708. The gain controller 708 gain-controls a signal output from the adder 707 based on power control bit information output from the controller 705. The gain-controlled output symbols are input to a PN (Pseudo-random Noise) scrambler 709. The PN scrambler 709 PN-scrambles its input signal, and transmits the PN-scrambled signal to a base station.

In the second embodiment of the controller 705, if retransmission is requested, the controller 705 outputs retransmission data and reverse pilot sequence information, and outputs power control information based on a power control bit (PCB) received over a forward link via the RF receiver 711. In addition, the controller 705 detects the number of retransmission data symbols from information received from the RF receiver 711. If the number of retransmission data symbols is determined in this manner, the controller 705 outputs a symbol transmission control signal to a channel encoder 702. In an initial transmission, the controller 705 outputs a symbol transmission control signal corresponding to the number of symbols necessary for initial transmission. In addition, the controller 705 outputs a TPR control signal according to whether current transmission is initial transmission or retransmission. The TPR control signal output from the controller 705 is used such that TPR is determined so that in the case of retransmission, a base station can receive code symbols at the same Eb/Nt value as that used during initial transmission. In this manner, when the TPR is controlled such that Eb/Nt of initial transmission is identical to Eb/Nt of retransmission, coding performance is optimized.

A CRC encoder 701 CRC-encodes retransmission data output from the controller 705. The CRC-encoded data output from the CRC encoder 701 is input to a channel encoder 702, and the channel encoder 702 channel-encodes the CRC-encoded data output from the CRC encoder 701. The channel encoder 702 encodes its input data at a predetermined code rate, and then outputs data symbols channel-encoded according to a symbol transmission control signal determined depending on the number of code symbols to be transmitted during initial transmission and retransmission. That is, when a code rate is 0.2, if the number of data bits is 100, the number of symbols generated in the channel encoder 702 becomes 500. From the generated 500 symbols, the number of output symbols is determined based on the symbol transmission control signal. In addition, in a case where the channel encoder 702 uses an IR method during retransmission, the controller 705 must output information on a start position and the number of output symbols together, because in the IR method, symbols transmitted during retransmission are different from symbols transmitted during retransmission.

When transmission is achieved by the IR scheme in this manner, both a base station and a mobile station must have information on the position of retransmission symbols as described in conjunction with FIG. 6. Therefore, when performing retransmission, a mobile station provides the position information to a base station, or when sending a retransmission request to a mobile station, a base station provides the position information to the mobile station. As a result, the mobile station and the base station both can have the position information. As another method, a base station and a mobile station can separately detect a start position of retransmission data symbols through a particular algorithm used in common by the base station and the mobile station.

A description will now be made of a method for determining the number of code symbols of retransmission data by the controller 705 of a mobile station.

Method for Determining a Number of Data Code Symbols during Retransmission by an MS (1) When an erasure occurs in received retransmission control information, 50% of the code symbols transmitted at initial transmission are transmitted during retransmission.

(2) When no erasure occurs in received retransmission control information, as many code symbols as the number determined according to the second embodiment are retransmitted.

The term "erasure" used in this method means that reception power of retransmission control information a mobile station received is low, so reliability is also low. That is, in the above method, if it is determined that reliability of received retransmission control information is high, the mobile station retransmits as many code symbols as the number indicated by the received retransmission control information. However, if it is determined that reliability of retransmission control information is low, the mobile station retransmits as many code symbols as a preset number.

Referring back to FIG. 7, a predetermined number of symbols output under the control of the controller 705 after being encoded by the channel encoder 702 are input to a modulator 703. The modulator 703 modulates the symbols output from the channel encoder 702. The modulated symbols output from the modulator 703 are Walsh-spread by a Walsh spreader 704 with a Walsh code for transmission. The spread symbols output from the Walsh spreader 704 are input to a TPR controller 706. The TPR controller 706 multiplies the Walsh-spread output symbols by a predetermined gain value based on a control signal output from the controller 705. At this point, if the current transmission is initial transmission, a gain value for initial transmission is multiplied, and if the current transmission is retransmission, a gain value for retransmission is multiplied. The gain-multiplied symbols output from the TPR controller 706 are input to an adder 707.

In the "Method for Determining a Number of Data Code Symbols during Retransmission by an MS," only when no erasure occurs in received retransmission control information, a mobiles station transmits as many code symbols as the number indicated by the received transmission control information. However, the method proposed in the present invention can be implemented even though a mobile station transmits as many code symbols as the number indicated by the received retransmission control information regardless of whether an erasure occurs or not.

A pilot sequence output from the controller 705 is input to a pilot Walsh spreader 710. The pilot Walsh spreader 710 Walsh-spreads the pilot sequence signal with a Walsh code for transmitting a pilot signal, and provides its output to the adder 707. The adder 707 then adds a signal output from the TPR controller 706 to a signal output from the pilot Walsh spreader 710, and provides its output to a gain controller 708. The gain controller 708 gain-controls a signal output from the adder 707 based on power control bit information output from the controller 705. The gain-controlled output symbols are input to a PN scrambler 709. The PN scrambler 709 PN-scrambles its input signal, and transmits the PN-scrambled signal to a base station.

While the present invention has been shown and described with reference to a certain preferred embodiment thereof, it will be understood by those skilled in the art that various changes in form and details may be made therein without departing from the spirit and scope of the invention as defined by the appended claims.

What is claimed is:

1. A mobile station apparatus for retransmitting data in a reverse direction upon receiving a retransmission request for a data transmitted from a base station after transmitting the data in the reverse direction in a mobile communication system supporting hybrid automatic retransmission request (HARQ), comprising:

a radio frequency (RE) receiver for receiving a retransmission control signal for the reverse data over a forward link; and a controller for determining whether to retransmit the reverse data using the retransmission control signal received from the RE receiver, and controlling transmission of retransmission data using a traffic-to-pilot power ratio (TPR) included in the retransmission control signal.

2. The mobile station apparatus of claim 1, further comprising a TPR controller for controlling a gain of the reverse data depending on the TPR output from the controller.

3. The mobile station apparatus of claim 1, wherein the controller determines a TPR value to be used during retransmission as ½ of an old TPR value, when an erasure occurs in the received retransmission control signal.

4. The mobile station apparatus of claim 1, wherein the controller sets a TPR value to be used during retransmission to a TPR value received over a forward channel, when no erasure occurs in the received retransmission control signal.

5. The mobile station apparatus of claim 1, wherein the radio frequency (RF) receiver comprises:

an antenna for receiving a radio frequency (RE) signal including a retransmission control signal from a base station;

a baseband converter for downconverting the RF signal to a baseband signal; and an analog-to-digital converter for converting the baseband signal to a digital signal.

6. A mobile station apparatus for retransmitting data in a reverse direction upon receiving a retransmission request for a data received from a base station after transmitting the data in the reverse direction in a mobile communication system supporting hybrid automatic retransmission request (HARQ), comprising:

a radio frequency (RF) receiver for receiving a retransmission control message for the reverse data over a forward link;

a controller for outputting a control signal including a number of retransmission data symbols depending on the retransmission control message received from the RF receiver; and a channel encoder for channel-encoding the reverse data, and outputting the encoded data according to the control signal.

7. The mobile station apparatus of claim 1, wherein the radio frequency (RF) receiver comprises:

an antenna for receiving a radio frequency (RF) signal including a retransmission control signal from a base station;

a baseband converter for downconverting the RF signal to a baseband signal; and an analog-to-digital converter for converting the baseband signal to a digital signal.

8. The mobile station apparatus of claim 6, wherein during retransmission, the controller extracts a symbol position value of output data from the retransmission control message included in the control signal.

9. The mobile station apparatus of claim 6, wherein the controller determines the number of retransmission symbols as ½ of a number of initial transmission symbols when the retransmission control message indicates an erasure.

10. The mobile station apparatus of claim 6, wherein the controller determines the number of retransmission symbols as the number of symbols indicated by the control information when the retransmission control message does not indicate an erasure.

11. The mobile station apparatus of claim 6, wherein the controller determines a position value of the reverse retransmission data using a value included in the control information.

12. The mobile station apparatus of claim 6, wherein the controller continuously determines a position value of the retransmission code symbols beginning at a symbol in a particular position among symbols and transmits the determined position information of the symbols over a given reverse channel.

13. A base station apparatus for transmitting a retransmission request message for received data in a mobile communication system supporting hybrid automatic retransmission request (HARQ), comprising:
an Eb/Nt (ratio of energy to interference per bit) calculator for measuring Eb/Nt of data received.
an error detection signal generator for checking whether there is an error in the received data and generating an error detection signal according to the checking result;
a controller for determining a traffic-to-pilot power ratio (TPR) value during retransmission using information received from the Eb/Nt calculator upon receiving the error detection signal for the received data from the error detection signal generator; and
a transmitter for forming forward control information using the TPR value determined by the controller, and transmitting the forward control information.

14. The base station apparatus of claim 13, wherein the controller determines the TPR value to be used during retransmission as ¼ of an old TPR value when a value detennined by dividing a total Eb/Nt value by a target Eb/Nt is at least equal to 1.

15. The base station apparatus of claim 13, wherein the controller determines the TPR value to be used during retransmission as ½ of an old TPR value when a value determined by a total Eb/Nt value by a target Eb/Nt is smaller than 1 and at least equal to 0.5.

16. The base station apparatus of claim 13, wherein the controller determines the TPR value to be used during retransmission to be equal to an old TPR value when a value determined by dividing a total Eb/Nt value by a target Eb/Nt is smaller than 0.5.

17. A base station apparatus for transmitting a retransmission request message for received data in a mobile communication system supporting hybrid automatic retransmission request (HARQ), comprising:
an Eb/Nt (ratio of energy to interference per bit) calculator for measuring Eb/Nt of the received data;
an error detection signal generator for checking whether the received data has an error and generating an error detection signal according to the checking result;
a controller for determining a number of retransmission code symbols using information received from the Eb/Nt calculator upon receiving the error detection signal for the received data from the error detection signal generator; and
a transmitter for forming forward control information using the number of retransmission code symbols determined by the controller, and transmitting the forward control information.

18. The base station apparatus of claim 17, wherein the controller outputs position information of retransmission code symbols to be requested for retransmission to the transmitter including the number of the retransmission code symbols when an error has occurred in the received data.

19. The base station apparatus of claim 17, wherein the controller determines the number of retransmission code symbols as ¼ of code symbols transmitted at an initial transmission when a value determined by dividing a total Eb/Nt value by a target Eb/Nt value is at least equal to 1.

20. The base station apparatus of claim 17, wherein the controller determines the number of retransmission code symbols as ½ of code symbols transmitted at an initial transmission when a value determined by dividing a total Eb/Nt value by a target Eb/Nt value is at least equal 0.5 and smaller than 1.

21. The base station apparatus of claim 17, wherein the controller determines the number of retransmission code symbols to be equal to a number of code symbols transmitted at an initial transmission when a value determined by dividing a total Eb/Nt value by a target Eb/Nt value is smaller than 0.5.

22. A method for retransmitting data in a reverse direction upon receiving a retransmission request from a bases station in a mobile communication system supporting hybrid automatic retransmission request (HARQ), comprising the steps of: (a) decoding a received signal, and determining whether the received signal includes the retransmission request; and (b) if the received signal includes the retransmission request, controlling a traffic-to-pilot power ratio (TPR) according to retransmission control information included in the received signal, and then performing retransmission through a reverse channel.

23. The method of claim 22, wherein the TPR value to be used during retransmission is ½ of an old TPR value when an erasure has occurred in the retransmission control information.

24. The method of claim 22, wherein the TPR value to be used during retransmission is a TPR value received over a forward channel when no erasure has occurred in the retransmission control information.

25. The method of claim 22, further comprising steps of:
receiving a radio frequency (RE) signal including a retransmission control signal from a base station;
downconverting the RF signal to a baseband signal; and
converting the baseband signal to a digital signal.

26. A method for retransmitting data in a reverse direction by a mobile station upon receiving a retransmission request from a base station in a mobile communication system supporting hybrid automatic retransmission request (HARQ), comprising the steps of:
(a) decoding a received control information, and determining whether the control information includes the retransmission request;
(b) if the control information includes the retransmission request, generating as many retransmission data symbols as a number of symbols, whose information is included in the control information; and
(c) retransmitting the generated retransmission data symbols over a reverse channel.

27. The method of claim 26, further comprising the step of controlling a gain of the generated retransmission data symbols before retransmitting the gain-controlled data symbols over the reverse channel.

28. The method of claim 26, wherein the step (b) comprises the step of channel-encoding the data symbols, and transmitting symbols other than previously transmitted code symbols among the channel-encoded symbols.

29. The method of claim 26, wherein when an erasure has occurred in the received control information, ½ of symbols transmitted during initial transmission are determined as retransmission data symbols.

30. The method of claim 26, wherein when no erasure has occurred in the received control information, as many symbols as the number indicated by the control information are determined as retransmission data symbols.

31. The method of claim 22, further comprising steps of:
receiving a radio frequency (RF) signal including a retransmission control signal from a base station;
downconverting the RF signal to a baseband signal; and
converting the baseband signal to a digital signal.

32. A method for transmitting a retransmission request message for received data in a mobile communication system supporting hybrid automatic retransmission request (HARQ), comprising the steps of:
(a) measuring Eb/Nt (ratio of energy to interference per bit) of reverse data when an error has occurred in the received data;
(b) determining a traffic-to-pilot power ratio (TPR) required during retransmission using a total Eb/Nt value of the received data; and
(c) forming control information using the TPR value required during retransmission, and transmitting the control information over a given forward channel.

33. The method of claim 32, wherein the step (b) comprises the step of comparing the total Eb/Nt value of the received data with a target Eb/Nt value.

34. The method of claim 33, wherein the target Eb/Nt value is determined by a set value during outer loop power control.

35. The method of claim 32, wherein when a value determined by dividing the total Eb/Nt value by a target Eb/Nt value is at least equal to 1, the TPR value to be used during retransmission is determined as ¼ of an old TPR value.

36. The method of claim 32, wherein when a value determined by dividing the total Eb/Nt value by a target Eb/Nt value is at least equal to 0.5 and smaller than 1, the TPR value to be used during retransmission is determined as ½ of an old TPR value.

37. The method of claim 32, wherein when a value determined by dividing the total Eb/Nt value by a target Eb/Nt value is smaller than 0.5, the TPR value to be used during retransmission is determined to be equal to an old TPR value.

38. A method for transmitting a retransmission request message for received data by a base station in a mobile communication system supporting hybrid automatic retransmission request (HARQ), comprising the steps of:
determining whether the data received in the reverse direction has an error;
determining a number of code symbols required during retransmission by comparing an Eb/Nt value of the data transmitted from a mobile station with a target Eb/Nt value; and
forming control information using information on the number of retransmission code symbols, and transmitting the control information.

39. The method of claim 38, wherein the target Eb/Nt value for a channel is a target Eb/Nt value for a channel during outer loop power control.

40. The method of claim 38, wherein when a value determined by dividing the total Eb/Nt value by the target Eb/Nt value is at least equal to 1, the number of retransmission code symbols is determined as ¼ of code symbols transmitted during an initial transmission.

41. The method of claim 38, wherein when a value determined by dividing the total Eb/Nt value by the target Eb/Nt value is at least equal to 0.5 and smaller than 1, the number of retransmission code symbols is determined as ½ of code symbols transmitted during an initial transmission.

42. The method of claim 38, wherein when a value determined by dividing the total Eb/Nt value by the target Eb/Nt value is smaller than 0.5, the number of retransmission code symbols is determined to be equal to a number of code symbols transmitted during an initial transmission.

* * * * *